Sept. 20, 1955 J. W. WATSON 2,718,393
LEAF SPRING SPACING STRUCTURES AND ANCHORAGES THEREFOR
Filed April 14, 1950
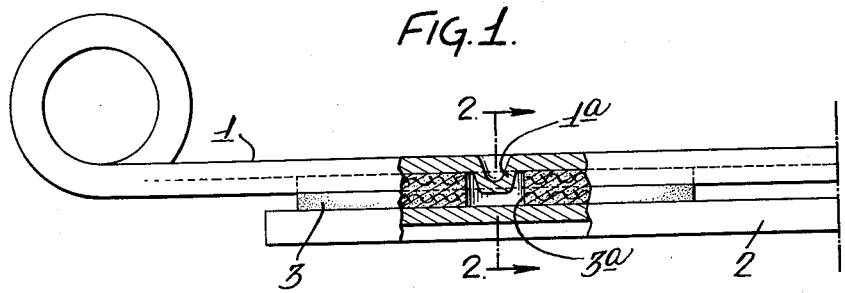
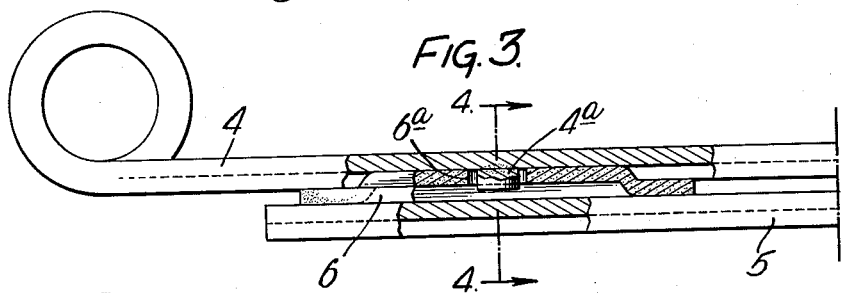
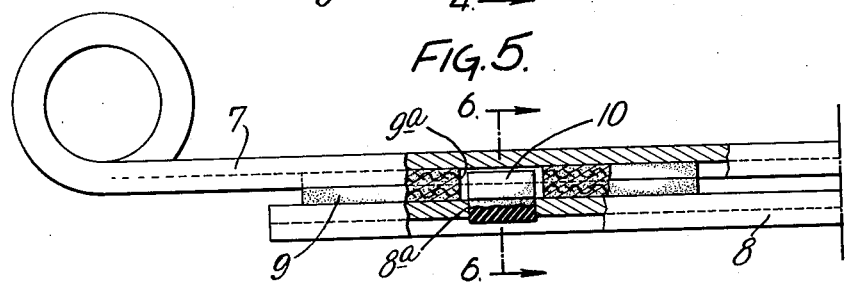
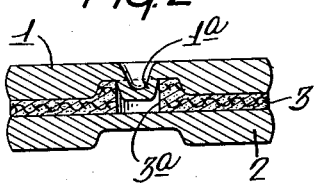 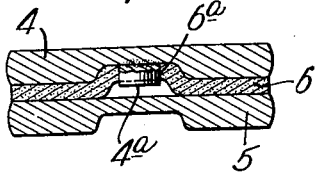 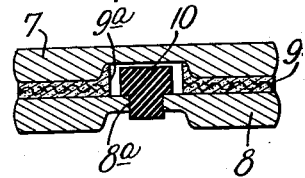
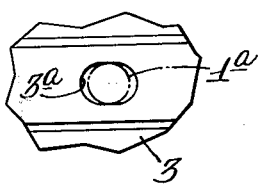 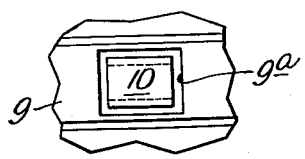 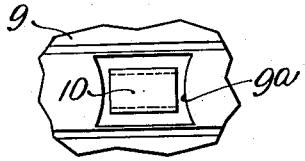
Inventor:
John Warren Watson
by his Attorneys
Howson & Howson

United States Patent Office 2,718,393
Patented Sept. 20, 1955

2,718,393

LEAF SPRING SPACING STRUCTURES AND ANCHORAGES THEREFOR

John Warren Watson, Wayne, Pa.

Application April 14, 1950, Serial No. 155,915

6 Claims. (Cl. 267—49)

This invention relates to leaf-end friction bearing structures for use in connection with spring leaves of center-groove section and to anchorage means for holding said structure in predetermined position between and adjacent the ends of said leaves while in service.

A particular object of my invention is to provide anchorage means permitting unopposed lateral movements of said bearing structure with relation to the flat or tension side of the shorter of said leaves.

A further particular object of my invention is to provide and utilize anchorage means of a nature to positively limit longitudinal movements and lateral movements and turning movements of said bearing structure and thus maintain it in positive predetermined position between said leaves and adjacent their ends while in service.

A further particular object of my invention is to provide a leaf-end friction bearing structure of a form to approximately coincide with the contour of the grooved or compression side of the longer of said leaves and with the flat or tension side of the shorter of said leaves and thus provide for direct contact of said leaves with the bearing structure over approximately its entire area.

A further particular object of my invention is to provide anchoring means for limiting longitudinal movements of the bearing structure and which means, in the interest of engineering choice and/or manufacturing expediency, may be placed in predetermined set position adjacent the end of either the longer leaf or the shorter leaf of any adjacent pair of leaves.

A further particular object of my invention is to provide anchoring means such as will permit, upon the spreading of the leaves, the free and instant removal of the bearing structure and its replacement in kind.

A further particular object of my invention is to provide a leaf-end friction bearing structure presenting to at least one of said leaves a surface of sufficient yieldability to readily conform, under the pressures imposed in service, to irregularities thereof and thus form an automatic seal against the entry of grit and abrasive-laden waters.

A further particular object of my invention is to provide a leaf-end friction bearing structure exhibiting frictional properties whereof the static and dynamic coefficients of friction are sufficiently in balance to avoid setting up destructive actions and/or objectionable noise-producing vibrations.

Other objects and advantages of the invention will be made apparent from the following description in connection with the accompanying drawings in which:

Figure 1 is a fragmentary side elevational view, partly in section, showing two adjacent leaves of a leaf spring and which leaves are of center-groove section, and a leaf-end friction bearing structure or liner spacing said leaves and an integral anchor element preformed in one of said leaves adjacent an end thereof and engaging a hole provided in said bearing structure and acting to limit longitudinal movements of said bearing structure with relation to said one leaf.

Figure 2 is a cross sectional view on line 2—2, Fig. 1.

Figure 3 is a fragmentary side elevational view, partly in section, showing two adjacent leaves of a leaf spring and which leaves are of center-groove section, and a leaf-end friction bearing structure or liner spacing said leaves and an anchor member or element welded to one of said leaves adjacent an end thereof and engaging a hole provided in said bearing structure and acting to limit longitudinal movements of said bearing structure with relation to said one leaf.

Figure 4 is a cross sectional view on line 4—4, Fig. 3.

Figure 5 is a fragmentary side elevational view, partly in section, showing two adjacent leaves of a leaf spring and which leaves are of center-groove section, and a leaf-end friction bearing structure or liner spacing said leaves and an anchor member or element positioned in one of said leaves adjacent an end thereof and engaging a hole provided in said bearing structure and acting to limit longitudinal movements of said bearing structure with relation to said one leaf.

Figure 6 is a cross sectional view on line 6—6, Fig. 5.

Figures 7, 8 and 9 are fragmentary plan views showing preferred hole details as will be discussed later in the application.

Referring to Figs. 1 and 2, numeral 1 designates one of two adjacent spring leaves of center-groove section; 2 designates the other of said leaves; 1a designates a preferably round integral boss or anchor element preformed in leaf 1 adjacent an end thereof; 3 designates a leaf-end friction bearing structure or liner spacing the leaves and conforming with both the center-grooved or compression side of leaf 1 and with the flat or tension side of leaf 2; 3a designates a hole provided in bearing structure 3 for the reception of anchor element 1a. This hole 3a may be made to just easily fit boss 1a or it may be made elongated, longitudinally of the spring, as illustrated, if it is desired to provide for a lost motion and float action as set forth in my co-pending application No. 743,997, dated April 25, 1947, now Patent 2,621,922, December 16, 1952.

Referring to Figs. 3 and 4, numeral 4 designates one of two adjacent spring leaves of center-groove section; 5 designates the other of said leaves; 4a designates a preferably round member or element securely fastened to leaf 4 adjacent an end thereof by welding or other suitable means; 6 designates a leaf-end friction bearing structure or liner spacing the leaves and partially conforming to both the center-grooved or compression side of leaf 4 and the flat or tension side of leaf 5; 6a designates a hole provided in bearing structure 6 for the reception of anchor member 4a. This hole 6a if desired may be made to just easily fit member 4a or it may be made elongated, longitudinally of the spring, as illustrated, for reason as above stated in connection with hole 3a.

Referring to Figs. 5 and 6, numeral 7 designates one of two adjacent spring leaves of center-groove section; 8 designates the other of said leaves; 8a designates a preferably elongated and round-ended hole provided in leaf 8 adjacent an end thereof. A round-ended hole is preferred to a square-ended hole for reasons of minimizing the possibility of spring leaf breakage and is also preferred if member 10 is to be made of soft rubber, as illustrated, in order to provide a space or cavity at each end of the rubber member to accommodate deformation flow as outlined in my co-pending application of this date, Serial No. 155,913. 9 designates a leaf-end friction bearing structure or liner spacing said leaves and conforming with both the center-grooved or compression side of leaf 7 and with the flat or tension side of leaf 8; 9a designates a hole provided in bearing structure 9; 10 designates a preferably elongated and square-ended anchor element or member of soft rubber or other suitable anchor material for engagement with holes 8a and 9a.

In anchoring a leaf-end friction bearing structure in predetermined limited set position between adjacent leaves of a leaf spring it has been general practice to effect such anchorage adjacent the end of the shorter leaf and allow all slippage, longitudinal and lateral, to take place between the bearing structure and the longer leaf. An exception to the above practice is that provided for in my co-pending application, dated April 25, 1947, Serial No. 743,997, now Patent 2,621,922, December 16, 1952, and wherein a longitudinal lost motion is allowed to take place between the bearing structure and the leaf to which it is anchored in order to allow slippage and wear to take place between the bearing structure and both of the leaves and thus avoid concentrations of such actions on but one surface of the bearing structure. In both the general practice and the above special practice, however, lateral movements of the bearing structure and the shorter leaf have been held to close limits. These close limits against lateral movements also provides for closely limiting turning movements of the bearing structure and have worked very satisfactorily in connection with leaves of S. A. E. flat section but have not worked with equal satisfaction in connection with leaves of center-groove section because the presence of the groove reduces by about one-third the bearing area presented to the bearing structure and thus concentrates and aggravates compression and wear against the bearing structure along its two longitudinal side portions. This leaves an untouched hill or ridge along the longitudinal center portion of the bearing structure and which ridge extends upwardly into the groove and bears against the side walls of the groove and acts to oppose lateral sliding movements of the bearing structure with relation to that leaf. It is seen, therefore, that the bearing structure is thus, in effect, locked against lateral sliding movements with relation to both of the leaves. This double anchorage is of little, if any, concern in a normal use of a leaf spring but is of great detriment when the spring is used in a manner known as the Hotchkiss drive and which use, over the rougher roads, causes severe lateral relative splaying of the leaves and which splaying is, of course, of greatest amplitude adjacent the ends of the longer pairs of leaves. Because of the lateral lock between the side walls of the groove and the longitudinal hill in the center of the bearing structure, the splaying actions are carried down through the bearing structure and against the primary anchorage carried by the lower leaf. Something must give way and experience has demonstrated that this give-way point occurs between the bearing structure and the primary anchorage which is held fast, laterally, with relation to the lower leaf. This results in a rapid deterioration of the bearing structure because of its fragile nature as compared to that of the primary anchor means.

The particular object of my invention is to avoid the above double anchorage against lateral movements and to use solely the side walls of the groove for such purpose and thus permit unopposed lateral sliding movements of the bearing structure with relation to the flat tension surface of the shorter or lower leaf.

I here provide two general methods of accomplishing this necessary single lateral anchorage for use with leaves of center-groove section. In connection with each of these methods, as is clearly shown in the cross sectional views Figs. 2, 4 and 6, I provide bearing structures which conform more or less to the contour of the groove in the longer leaf and avoid holding the bearing structure against lateral movements with relation to the shorter leaf. In Figs. 2 and 4 I employ anchorage means in predetermined set position with relation to the longer of the leaves for limiting longitudinal movements of the bearing structure. It is clearly seen that the bearing structure is now completely free to slide laterally with relation to the flat tension surface of the shorter leaf.

In Fig. 6 I employ anchorage means in predetermined set position with relation to the shorter leaf for limiting longitudinal movements of the bearing structure. It will be noted that the anchor member or element 10 is here illustrated as being made of soft rubber and also that hole 9a in the bearing structure is made wider than that portion of the anchor member which resides within it. The lateral lost motion thus provided for, together with the yieldability of the soft rubber anchor member, permits an ample extent of lateral sliding motion of the bearing structure with relation to the flat tension surface of that leaf to accommodate such relative splaying of the leaves as may be expected to occur in service. Should it be preferred to use an anchor member of rigid material in place of the yieldable soft rubber anchor member, a greater degree of free lateral lost motion should be provided for and such member 10 should, therefore, be made slightly narrower or hole 9a slightly wider than here shown in order to provide for this free and unobstructed splay amplitude.

Referring to the above two general methods for allowing unopposed lateral sliding of the bearing structure with relation to the shorter leaf, manufacturing expediency may be relied upon to properly elect which of the two general methods may be preferred for limiting longitudinal movements of the bearing structure. It is understandable that spring makers might hesitate to disturb the physical structure of a spring leaf at any appreciable distance in from its tip end. However, I feel that neither the integral anchor element 1a or the welded member or element 4a will in any degree jeopardize the strength of the leaf. Also I feel that even a one-quarter inch round hole through the thin center portion of the longer leaf will prove to be perfectly safe and in which event a press fitted steel stud, of some such round design as indicated by numeral 10, Figs. 5 and 6 in my co-pending application of this date, Serial No. 155,911, might be employed. In fact, I have had road tests of this latter method now running for several thousand miles and so far all is well.

Figure 7 is a fragmentary plan view of bearing structure 3 and shows a slightly elongated and round-ended hole therein and a round anchor stud or element for limiting longitudinal movements of the bearing structure with relation to the longer leaf such as shown in Figs. 1 and 2 and Figs. 3 and 4.

In connection with the second method for limiting longitudinal movements of the bearing structure as shown in Figs. 5 and 6, and wherein the anchoring member or element is in predetermined set position with relation to the short of the two leaves, the following should be noted. If it should be preferred to employ a member of rigid material, such for example as hard rubber or extruded or die cast aluminum etc., in place of member 10 which is here designated as being of soft rubber, it would seem preferable that such member be of rectangular shape, such for example as here shown, rather than a round or curved end member. Repeated pressure contact of a round member against the ends of hole 9a in the bearing structure would act to form indentations therein and interfere with a free lateral movement of the bearing structure with relation to leaf 8.

In Figure 8 I show a form of hole in the bearing structure for proper cooperation with the end portions of a rectangular member constructed of soft rubber. Made of soft rubber, anchor member 10 can make no indentations in the ends of the hole in the bearing structure and hence no special provision, such as shown in Fig. 9, is necessary.

In Figure 9 I show a form of hole in the bearing structure for proper cooperation with the end portions of a rectangular member constructed of rigid material. With some such relationship between the anchor member and the ends of the hole no indentations of a nature to oppose free lateral movements between the anchor member and the bearing structure can be effected.

It will be noted that in each of the species here shown I have provided a hole in the bearing structure which is appreciably longer than the longitudinal dimension of the anchor member or element. This is done to provide the lost motion or float above referred to and represents merely my own personal preference. Longitudinal close fits between the anchor element and the hole in the bearing structure may be employed if preferred and without departing from the spirit of the invention and the scope of the claims.

In addition to the foregoing, which deals with holding the bearing structure against lateral movements with relation to the grooved or compression side of the longer leaf and for permitting free lateral slide to take place between the bearing structure and the flat tension side of the shorter leaf, a further very important advantage disclosed by this invention is that of providing an approximately complete bearing area between the bearing structure and each of the leaves as measured by the width of the spring and the length of the bearing structure. Such construction provides the lowest possible pressure per square inch for any given length of bearing structure and in many applications it will be found possible to use bearing structures of decreased length for that reason. Economy is an important factor. With this construction all that subtracts from complete bearing area is the area of the hole in the bearing structure, and possibly, an occasional surface flaw or flaws which might be traced to the manufacturing process.

There are now several materials on the market such as impregnated cotton webbings, impregnated saturating papers and other materials of a composite nature, see U. S. Patent No. 1,845,096, exhibiting inherent frictional properties whereof the static and dynamic coefficients of friction are in acceptable balance for this duty. In Figs. 1 and 2 and Figs. 5 and 6 I show, and at the moment prefer, structures of impregnated and coated textile webbing. In Figs. 3 and 4 I show a member of composite structure, such for example as latex paper and which may be molded or pressed, or otherwise preformed to conform as desired with relation to the respective surface contours of the two leaves. In my co-pending application as of this date, Serial No. 155,917, I disclose the advantages of this latex material for this duty. For duty in vehicle springs this latex paper material should be coated as stated in my above-mentioned co-pending application. It is reasonable to expect that there will be forthcoming other materials exhibiting the above inherent frictional properties and which may be molded or pressed and thus be suitable for use in connection with this invention.

The term "elongated" as here used refers to a horizontal and not a vertical characteristic.

Although but several embodiments of the invention have herein been shown and described, it will be understood that various changes in the size, shape and arrangement of parts may be made without departing from the spirit of the invention or from the scope of the appended claims.

I claim:

1. In combination, two adjacent leaves of a leaf spring and which leaves are of unequal length and the longer of which is of center-groove section, a leaf-end friction bearing structure between said leaves and contacting both of them and presenting to at least one of them a surface of sufficient yieldability to conform to irregularities thereof, and anchoring means for positively limiting any and all longitudinal, lateral and turning movements of said bearing structure with relation to said leaves while in service yet offering no opposition to lateral sliding movements of said bearing structure with relation to the flat tension surface of the shorter of said leaves such as would be caused by lateral fanning or splaying actions between said leaves adjacent their end portions, said bearing structure being limited as to lateral and turning movements with relation to said leaves by contact with the side walls of said groove in said longer leaf and being limited as to longitudinal movements with relation to said leaves by said anchoring means comprising an anchoring device in definite position adjacent an end of one of said leaves and in longitudinal movement-limiting engagement with said bearing structure.

2. In combination, two adjacent leaves of a leaf spring and which leaves are of unequal length and the longer of which is of center-groove section, a leaf-end friction bearing structure between said leaves and contacting both of them and presenting to at least one of them a surface of sufficient yieldability to conform to irregularities thereof, and anchoring means for positively limiting any and all longitudinal, lateral and turning movements of said bearing structure with relation to said leaves while in service, said bearing structure being limited as to lateral and turning movements with relation to said leaves by contact with the side walls of said groove in said longer leaf and being limited as to longitudinal movements with relation to said leaves by said anchoring means comprising an anchoring device in definite position adjacent an end of the shorter of said leaves and in longitudinal movement-limiting engagement with a hole provided in said bearing structure, the transverse dimension of said hole being appreciably greater than that of said anchoring device.

3. In combination, two adjacent leaves of a leaf spring and which leaves are of unequal length and the longer of which is of center-groove section, a leaf-end friction bearing structure between said leaves and contacting both of them, said bearing structure comprising rubber or rubber-like material and presenting to at least one of said leaves a surface of sufficient yieldability to conform to irregularities thereof, and anchoring means for positively limiting any and all longitudinal, lateral and turning movement of said bearing structure with relation to said leaves while in service yet offering no opposition to lateral sliding movements of said bearing structure with relation to the flat tension surface of the shorter of said leaves such as would be caused by lateral fanning or splaying actions between said leaves adjacent their end portions, said bearing structure being limited as to lateral and turning movements with relation to said leaves by contact with the side walls of said groove in said longer leaf and being limited as to longitudinal movements with relation to said leaves by said anchoring means comprising an anchoring device in definite position adjacent an end of one of said leaves and in longitudinal movement-limiting engagement with said bearing structure.

4. In combination, two adjacent leaves of a leaf spring and which leaves are of unequal length and the compression side of the longer of said leaves presenting a surface of non-flat or uneven contour and the tension surface of the shorter of said leaves presenting a surface of flat or even contour, a leaf-end friction bearing structure between said leaves and presenting to at least one of them a surface of sufficient yieldability to conform to irregularities thereof and presenting to each of said above described leaf surfaces a surface in approximate conformity therewith, and anchoring means for positively limiting any and all longitudinal, lateral and turning movements of said bearing structure with relation to said leaves while in service yet offering no opposition to lateral sliding movements of said bearing structure with relation to the flat tension surface of the shorter of said leaves such as would be caused by lateral fanning or splaying actions between said leaves adjacent their end portions, said bearing structure being limited as to lateral and turning movements with relation to said leaves by reason of its conformity with the uneven contour of the compression side of said longer leaf and being limited as to longitudinal movements with relation to said leaves by said anchoring means comprising an anchoring device in definite position adjacent an end of one of said leaves and in longitudinal movement-limiting engagement with said bearing structure.

5. In combination, two adjacent leaves of a leaf spring and which leaves are of unequal length and the longer of which is of center-groove section, a leaf-end friction bearing structure between said leaves and contacting both of them and presenting to at least one of them a surface of sufficient yieldability to conform to irregularities thereof and being limited as to lateral and turning movements with relation to said grooved leaf by contact with the side walls of said groove in said leaf, and anchoring means positively limiting longitudinal movements of said bearing structure with relation to one of said leaves, said anchoring means comprising an anchoring device integral with one of said leaves adjacent an end thereof and in longitudinal movement-limiting meshed engagement with said bearing structure.

6. In combination, two adjacent leaves of a leaf spring and which leaves are of unequal length and the longer of which is of center-groove section, a leaf-end friction bearing structure between said leaves and contacting both of them and presenting to at least one of them a surface of sufficient yieldability to conform to irregularities thereof and being limited as to lateral and turning movements with relation to said grooved leaf by contact with the side walls of said groove in said leaf, and anchoring means positively limiting longitudinal movements of said bearing structure with relation to one of said leaves, said anchoring means comprising an anchoring device welded to one of said leaves adjacent an end thereof and in longitudinal movement-limiting meshed engagement with said bearing structure.

References Cited in the file of this patent

UNITED STATES PATENTS

| | | |
|---|---|---|
| 2,028,299 | Swinton | Jan. 21, 1936 |
| 2,161,838 | Thompson | June 13, 1939 |
| 2,270,516 | Dow | Jan. 20, 1942 |
| 2,319,172 | Watson et al. | May 11, 1943 |